United States Patent
Conreux et al.

(12) 
(10) Patent No.: US 12,293,621 B2
(45) Date of Patent: May 6, 2025

(54) DEVICES AND METHOD FOR DIGITAL CONSIGNMENT OF PHYSICAL RESOURCES WITHIN AN INDUSTRIAL ENVIRONMENT

(71) Applicant: VALUE HIBRID, S.L., Madrid (ES)

(72) Inventors: Stéphane Conreux, Nancy (FR); Roland De La Chapelle, Levallois Perret (FR)

(73) Assignee: VALUE HIBRID, S.L., Madrid (ES)

( * ) Notice: Subject to any disclaimer, the term of this patent is extended or adjusted under 35 U.S.C. 154(b) by 0 days.

(21) Appl. No.: 17/787,644

(22) PCT Filed: Dec. 10, 2020

(86) PCT No.: PCT/FR2020/052367
§ 371 (c)(1),
(2) Date: Jun. 21, 2022

(87) PCT Pub. No.: WO2021/130421
PCT Pub. Date: Jul. 1, 2021

(65) Prior Publication Data
US 2022/0415107 A1 Dec. 29, 2022

(30) Foreign Application Priority Data
Dec. 23, 2019 (FR) ........................... 1915429

(51) Int. Cl.
G07C 9/29 (2020.01)
G06K 7/14 (2006.01)
G07C 9/33 (2020.01)

(52) U.S. Cl.
CPC ............. G07C 9/29 (2020.01); G06K 7/1417 (2013.01); G07C 9/33 (2020.01)

(58) Field of Classification Search
CPC ........... G07C 9/29; G07C 9/33; G06K 7/1417
See application file for complete search history.

(56) References Cited

U.S. PATENT DOCUMENTS

| | | | |
|---|---|---|---|
| 8,797,138 B2 * | 8/2014 | Myers | G07C 9/00571 340/5.7 |
| 2009/0132813 A1 * | 5/2009 | Schibuk | G06Q 20/4014 726/9 |
| 2013/0214903 A1 * | 8/2013 | Kalous | E05B 65/48 340/5.61 |
| 2014/0068247 A1 * | 3/2014 | Davis | G07C 9/00309 713/182 |
| 2017/0140596 A1 | 5/2017 | Retzlaff et al. | |
| 2020/0349786 A1 * | 11/2020 | Ho | G06V 40/172 |
| 2021/0074092 A1 * | 3/2021 | Davis | G07C 9/00571 |

* cited by examiner

*Primary Examiner* — Mohamed Barakat
(74) *Attorney, Agent, or Firm* — DUANE MORRIS LLP; Gregory M. Lefkowitz; Randall C. Pyles

(57) ABSTRACT

An aspect of the invention relates to a method for controlling access to a physical resource by a blocking device which can be locked and unlocked, comprising steps of locking and unlocking the blocking device which comprise comparing an access code transmitted by a first individual device with an access code associated with a first agent, and a step of consigning the blocking device using a set of second individual devices, wherein the unlocking can be carried out only when each of the second individual devices of the set has de-consigned the blocking device.

9 Claims, 2 Drawing Sheets

[Fig. 1]
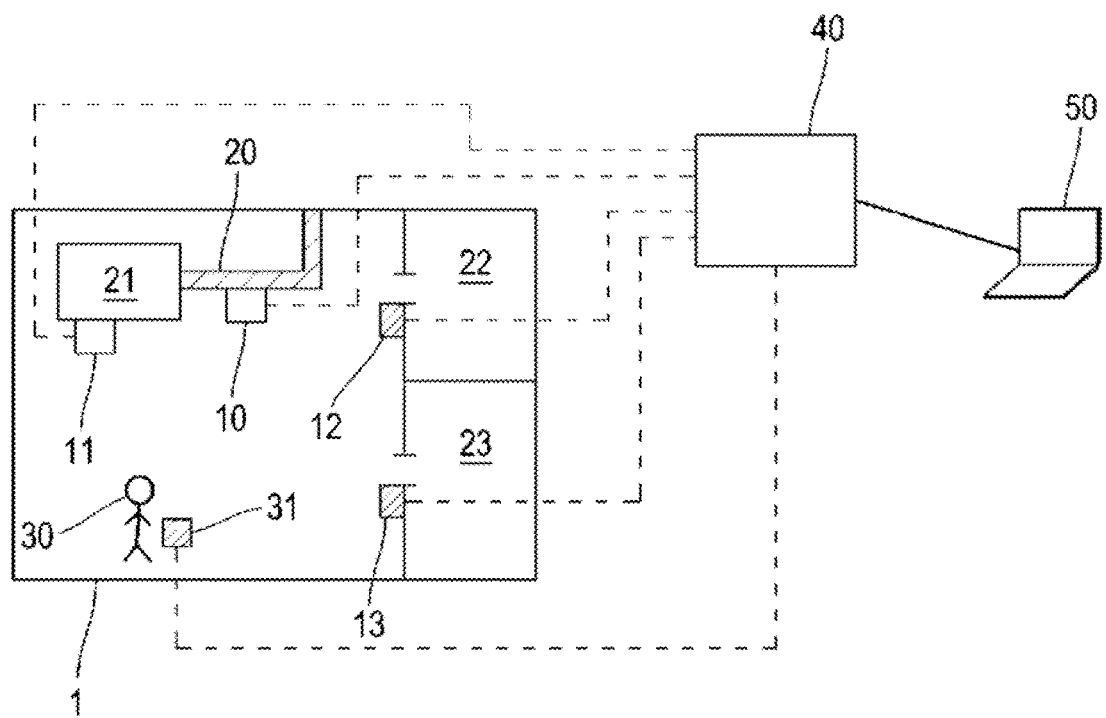
[Fig. 2]
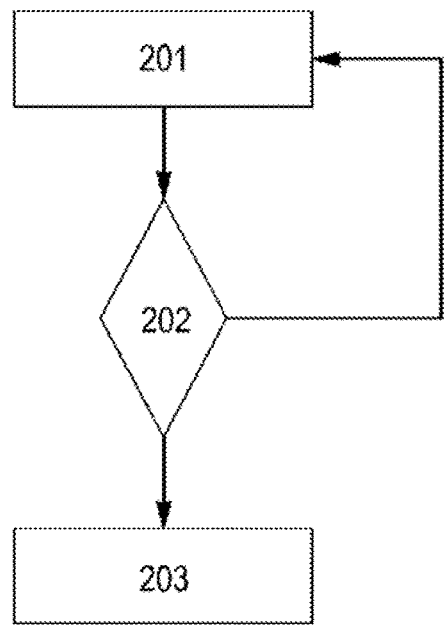

[Fig. 3]
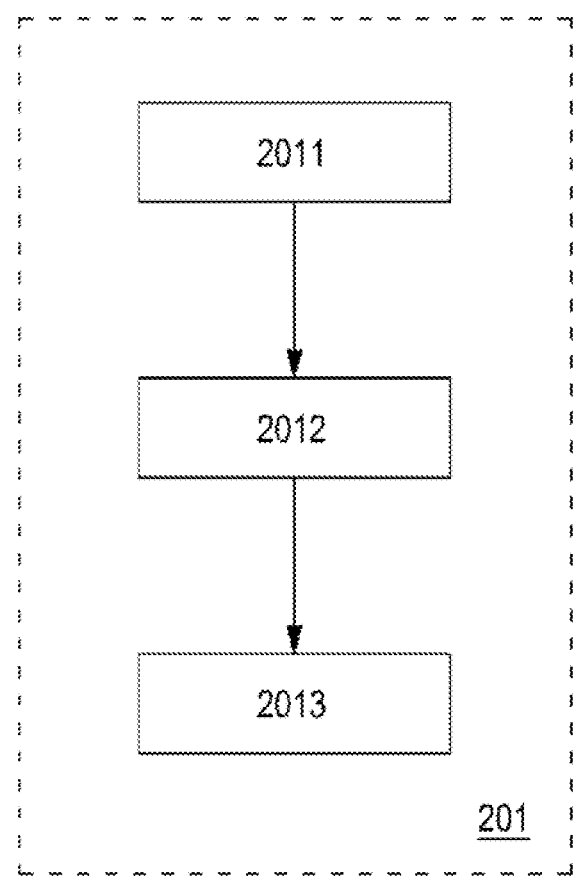
[Fig. 4]
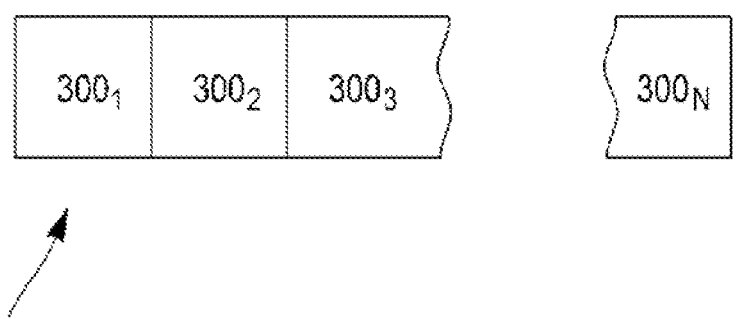

DEVICES AND METHOD FOR DIGITAL CONSIGNMENT OF PHYSICAL RESOURCES WITHIN AN INDUSTRIAL ENVIRONMENT

CROSS-REFERENCE TO RELATED APPLICATIONS

This application is a § 371 national stage entry of International Application No. PCT/FR2020/052367, filed Dec. 10, 2020, and based on France Priority Application No. FR1915429, filed Dec. 23, 2019, the entire contents of which are incorporated herein by reference.

TECHNICAL FIELD

The present invention relates to the blocking, or padlocking, of physical resources, in particular in the context of safety. In particular, the invention applies to compliance with safety standards such as OSHA standard 1910.147.

BACKGROUND OF THE INVENTION

Industrial installations can pose physical risks to workers who have to handle them. In particular, there may be a high risk in the case of maintenance of a machine or other equipment if, by mistake, the latter is restarted while a maintenance agent is working on it. These physical risks may include injury and death.

Consequently, rules are laid down to prevent these risks in companies or establishments. These rules may be the subject of standards. This is, for example, the case of standard 1910.147, established by the US Occupational Safety and Health Administration (OSHA).

In 1989, OSHA introduced Standard 29 CFR 1910.147—The Control of Hazardous Energy, to establish the padlocking and signposting requirements applicable to industry as a whole. The purpose of padlocking/signposting is to control the risks of energy release during the use or maintenance of machinery and equipment.

This control of dangerous energies generally involves blocking the physical resource concerned (machine, equipment, energy source, etc.). This blocking can be implemented by blocking devices, of the "padlock" type, according to the LOTO (LockOut/TagOut) principle described by OSHA standard 1910.147. This principle, although not obligatory in some countries, such as France, is nevertheless strongly recommended.

Although achieving a high level of security, the mechanisms and processes based on the LOTO principle have many drawbacks.

Thus, on an industrial site, it is common to have to deploy hundreds of mechanical locks. These locks are subject to wear and tear, to the risk of loss, and form a significant cost centre for businesses. The management of these numerous locks also requires precise administrative management, which also has a cost for businesses.

In addition, the loss of a lock key, or a staff member leaving the site with his key, is likely to permanently block access to a physical resource until a solution is found. This situation can of course penalize the profitability of the company and can also represent a significant cost.

The present invention aims to improve the situation compared to current solutions of the state of the art for implementing the LOTO principles and the OSHA1910.47 standard. More generally, it aims to provide a mechanism for controlling secure access to physical resources, in particular within an industrial establishment, which is simple both for agents having to work on these physical resources, and for operators having to manage the industrial establishment and its staff of agents.

SUMMARY OF THE INVENTION

To this end, the present invention proposes a method for controlling access to a physical resource by means of a blocking device that can be locked and unlocked, the steps of locking and unlocking said blocking device comprising
comparing an access code transmitted by a first individual device with an access code associated with a first agent,
and a step of padlocking said blocking device by means of a set of second individual devices, said unlocking being performed only when each of the second individual devices of said set has unpadlocked said locking device.

According to preferred embodiments, the invention comprises one or several of the following characteristics, which can be used separately or in partial combination with each other or in total combination with each other.
said individual devices are of a type comprising a mobile telecommunication terminal, a computer used by said agent in a secure manner, a digital key and/or a badge.
said padlocking and unpadlocking comprises transmitting an access code via said second individual devices and comparing said access codes with access codes associated with respective agents.
the method further comprises a step of determining the geolocation of said individual devices and wherein said locking, unlocking, padlocking and unpadlocking are performed only in the event of proximity between said geolocation and the geolocation of said blocking device.
said locking, unlocking, padlocking and unpadlocking are carried out only if there is a match between a time slot associated with said agent, a time slot associated with said physical resource, and the current time.

Another aspect of the invention relates to a computer program comprising instructions for implementing the method as described above on an information processing platform.

Another aspect of the invention relates to an individual device for access to a physical resource whose access is controlled by a blocking device capable of being locked and unlocked;
means for determining an identifier of said blocking device,
means for determining an access code associated with this identifier within a memory internal to said individual device;
means for transmitting said access code to said blocking device.

According to one embodiment, this individual device is such that said means for determining an identifier of said blocking device comprise a photographic capture means adapted for the recognition of an optical code.

Another aspect of the invention relates to a device for blocking access to a physical resource that can be locked and unlocked, configured to receive an access code from a first individual device and such that the locking and unlocking of said blocking device comprises comparing said access code with an access code associated with a first agent, said blocking device being further configured to be padlocked by a set of second individual devices, and such that unlocking can only be performed when each of the second individual devices of said set has unpadlocked said blocking device.

Another aspect of the invention is a system for controlling access to an array of physical resources of an industrial site, comprising a set of blocking devices associated with said physical resources such as those described above.

Other characteristics and other advantages of the invention will become apparent on reading the following description of different embodiments of the invention, given by way of example and with reference to the attached drawings.

BRIEF DESCRIPTION OF THE DRAWINGS

Other characteristics and advantages of the invention will be presented in a detailed description and illustrated by the following figures, with the help of the following description, made with reference to the attached drawings, which represent:

FIG. 1 represents an implementation context of the invention according to one embodiment.

FIG. 2 and FIG. 3 portray an embodiment of the method according to the invention.

FIG. 4 schematically shows a list of individual devices according to an embodiment of the invention.

FIG. 1 illustrates an example of an industrial environment 1 comprising several physical resources 20, 21, 22, 23. These physical resources can typically be machines 21, energy sources 20, but they can be generalized into other types of resources such as secure premises 22, 23. An industrial environment 1 may be a closed site, but also an open environment (oil pipeline, oil platform, industrial construction site, etc.)

The physical resources for which access is to be controlled or secured are associated with blocking devices 10, 11, 12, 13, respectively. These blocking devices have locked and unlocked positions. In the locked position, they physically prevent access to the physical resources: it is then impossible to open the doors of the premises 22, 23, to put the machine or the equipment 21 into operation, or to connect the power supply 20.

In general, access to equipment is controlled by locking access to its energy sources 20. However, it may also be possible to lock the control panel, for example, of an item of equipment 21.

The agents 30 having to intervene on each of the physical resources have individual items of equipment 31. These individual items of equipment have a key function, enabling the collective locking and unlocking of the blocking devices.

In particular, the individual items of equipment are designed to transmit an access code to the blocking devices, which are themselves designed to receive it. These access codes are preconfigured in the individual devices and in the blocking devices, so that locking and unlocking can be based on comparing the access code transmitted by an individual device with an access code associated with the agents.

From the point of view of the blocking device, this comparison makes it possible to ensure that the agent is indeed in possession of the rights to lock or unlock, in the manner of a user in possession of the correct key. In one embodiment, the method ensures that the individual device is in possession of the correct access code (correct key) and that the agent indeed has the rights to use this access code.

The individual device may be a mobile telecommunication terminal (of the "smartphone" or digital tablet type), or a digital key, a digital badge (RFD . . . ), a computer or any other device able to store data (in order to store at least one or several access codes) and having communication means in order to communicate with the blocking devices. The digital key may comprise a physical item adapted to be inserted into a security slot, but it may also be a device of the badge type configured to enter into communication with the blocking device by magnetic or radio means.

Communication can be implemented using different mechanisms such as NFC (Near Field Communication) or RFID, WiFi, Bluetooth, etc.

The access codes can also be implemented in different ways.

According to one embodiment, the access codes comprise an identifier of the agent and a code corresponding to the blocking device. The identifier of the agent makes it possible to ascertain which agent is in possession of the key and the code of the blocking device makes it possible to ensure that he is in fact in possession of the right to lock or unlock this blocking device in particular. This code corresponding to the blocking device may be a digital key or a simple identifier, depending on the desired degree of security of access.

According to another embodiment, the access codes comprise an identifier of the agent and a specific identifier known only to the paired individual device/blocking device.

According to one aspect of the invention, the code corresponding to the blocking device is securely accessible by the individual device. In particular, the agent may need to access this device in a secure manner. This secure access can typically be the capture of an identifier and a password.

For example, a specific software application may be downloaded to the individual device (which may be a smartphone or other device able to install software applications). The agent identifies himself to the application, and the individual device then instantiates the rights of the agent by allowing him to transmit the access code. Thus, the application makes it possible to manage access rights to a logic resource which is the code corresponding to the blocking device.

It is thus possible, depending on the deployment desired, to assign individual rights to a particular agent, or else to give functional rights by configuring "accounts" corresponding to functions or by associating agents with functions.

This embodiment also makes it possible to decorrelate the individual devices of the agents, so that each agent can receive a simplified individual device when entering the site, and access his rights by identifying himself on the application. It is also possible to allow agents to use their own devices (personal phones), by installing a specific application.

Alternatively, each blocking device may be associated with a list of agents configured to store agent identifiers padlocking the blocking device.

According to the invention, access to a physical resource by a blocking device can be locked in two steps. First, a first individual device locks the blocking device. This step physically blocks access to the physical resource. In a second step, one or several other individual devices padlock this locking, so that all of these other individual devices are required to unpadlock this locking, so that the first individual device can unlock the blocking device.

In other words, a first agent manages a right of access to the physical resource, by locking the blocking device with his individual device, but this right of access is padlocked by a set of other agents. This padlocking/unpadlocking mechanism corresponds to mechanisms known to those skilled in the art of managing secure industrial processes.

According to an embodiment of the invention, the first and the other individual devices may be of different types. Indeed, the first individual device may be a mobile telecommunication terminal or a digital key, and the other individual devices, operating the padlocking and unpadlocking of the right of access of the first agent who has locked the blocking device, may be mobile telecommunication terminals or computers. Indeed, the padlocking and unpadlocking can be entirely by software and digital, while the locking by the first individual device can have a hardware aspect.

The padlocking and unpadlocking comprises transmitting an access code via the other individual devices and comparing these access codes with access codes associated with agents.

During padlocking, the comparison may aim to ensure that the access code corresponds to an authorized agent. During unpadlocking, the comparison may be aimed at ensuring that it is indeed an agent who has previously padlocked the blocking device, that is, that he indeed belongs to the list associated with the blocking device. He can then be removed from this list or he can be associated with a label indicating that he has unpadlocked the blocking device.

This list may be stored on a server 40 or on a computer platform (of the server farm or "cloud" type). According to one embodiment, when the blocking device receives an access code from an individual device, it can transmit a request to this server 40.

The request may contain the identifier of the individual device and the server may simply send back the associated access code. The blocking device can then perform the comparison.

The request can also contain the access code received, and the server 40 can then perform the comparison and send the result of this comparison back to the blocking device, that is, whether or not there is a match.

The list play also be provisioned on the blocking device. This implementation makes it possible to safeguard against any accidental break in the telecommunication link between this device and the server 40.

According to one characteristic of the invention, unlocking is performed when the condition of a match in the comparison between access codes is fulfilled (individual unpadlocking) for each of the agents included in the list associated with a blocking device.

FIG. 4 illustrates such a list 300 for a given blocking device, comprising the identifiers of the agents $300_1$, $300_2$, $300_3$, ..., $300_N$. This list specifies the agents who have padlocked the blocking device. They have thus collectively blocked access to the physical resource associated with this blocking device.

FIGS. 2 and 3 illustrate possible embodiments for the unlocking 200 of a blocking device.

In one step 201, a condition of unpadlocking for an agent is verified.

This condition comprises, in one step 2011, the matching of the comparison of an access code transmitted by this individual device with an access code associated with this agent, as described above, According to one embodiment, this comparison can be made for the identifier of the agent on the one hand, and for the code corresponding to the blocking device on the other hand.

The condition may also comprise, in one step 2012, a proximity test according to which the geolocation of the individual device is determined, and this geolocation is compared with that of the blocking device. If the comparison indicates that the two devices are nearby, it can be deduced that the agent is indeed on site. Otherwise, it may be an attempt of fraud. The two devices can be considered to be nearby if their geolocations are at a distance less than a predetermined threshold, for example 1 metre.

According to one embodiment, this mechanism can also be set up for the first individual device and for the locking, unlocking and padlocking steps. Consequently, these locking, unlocking, padlocking and unpadlocking steps are carried out only in the event of proximity between the geolocation of the individual device concerned and the geolocation of the blocking device.

The condition may also comprise, in one step 2013, the match between a time slot associated with the agent and a time slot associated with said physical resource.

It is thus possible to confer time slots to each agent corresponding to the times at which he is supposed to work on the site. It is likewise possible to determine a slot corresponding to the times during which he is authorized to operate the physical resource. By comparing each of these time slots with the current time, it can be determined whether the condition is met for this agent and whether he can unpadlock the blocking device.

According to one embodiment, this mechanism can also be set up for the first individual device and for the locking, unlocking and padlocking steps. Consequently, the locking, unlocking, padlocking and unpadlocking steps are performed only if there is a match between a time slot associated with the agent in question, a time slot associated with said physical resource and the current time.

The various sub-conditions can be verified in an order different from that shown in FIG. 2B.

In one step 202, it is verified whether the unpadlocking condition has been verified for all the agents of the list 300. If this is not the case, the process loops back to step 201. We then wait for a next individual device to appear.

If all the agents have correctly unpadlocked the blocking device, in one step 203, the unlocking can be carried out by the agent associated with the first individual device, that is, the one who locked the blocking device, and has thus assumed the right of access to the physical resource concerned.

Thus, according to the invention it is possible to control access to a physical resource by requiring the participation of a number of agents for the unlocking. This practice enables greater security of access and complies with certain security standards, in particular the aforementioned OSHA standard 1910.147.

For locking, the same condition can be applied as for unlocking (matching of access codes and, depending on the embodiments, proximity and matching of time slots with the current time).

Furthermore, according to one embodiment, the locking of a blocking device can only be considered complete when a predefined set of agents has proceeded to padlock the blocking device. This embodiment makes it possible to define fairly precise access rights policies by defining agents that must absolutely intervene for access to certain physical resources.

An alarm may be triggered when not all the agents have proceeded with their locking when an alarm condition has been reached. This alarm condition may be the occurrence of a given time, or a delay since the first padlocking. This alarm may be a visual alarm, an audible alarm, or an alert message to an administration platform 50.

This administration platform 50 is functionally connected to the server 40. It can have a man-machine interface enabling an operator to manage and supervise the blocking devices 10, 11, 12, 13, and the agents 30 with their associated individual device 31.

In particular, it makes it possible to receive alarms if a blocking device is not completely locked when an alarm condition is reached. It makes it possible to manage a list 300 of agents for each of the blocking devices. It also makes it possible to define the access codes for each blocking device and to provision them for each individual device.

According to one embodiment, it also makes it possible to define the time slots for the blocking devices and the agents.

It thus makes it possible to have access to all the information from the devices involved on an industrial site and to define the access policies to the physical resources of the industrial site. It also makes it possible to monitor any anomalies and thus be able to react as soon as possible: abnormal rate of attempted unlocking with a wrong access code, etc.

The individual devices 31 may also comprise means for determining the blocking device 10, 11, 12, 13 with which an interaction must be made. Indeed, the agent 30 may have a single individual device enabling the locking and unlocking of several blocking devices. In which case, the individual device may include a memory in which an access code is associated with the various blocking devices with which it may operate.

To do this, each blocking device can be associated with an identification element enabling the individual device to identify it and then transmit the corresponding access code thereto.

According to one embodiment, this identification element may be a graphic code, in particular of the "QR code" type. This code can be recognized by a photographic capture means included in the individual device.

Other embodiments are possible (radio code of the RFID type, etc.).

According to one embodiment; the individual device thus identifies the blocking device and, if the agent using it has the appropriate rights, transmits the corresponding access code to the blocking device.

The invention claimed is:

1. A method for controlling access to a physical resource of an industrial site by a lockable and unlockable blocking device of a padlock type, comprising:
    locking and unlocking said blocking device, comprising comparing an access code transmitted by a first individual device as a mobile telecommunication terminal, a badge or a digital key and a second individual device as a mobile telecommunication terminal or computer with an access code associated with a first agent who has locked the blocking device, and
    padlocking said blocking device by a set of second individual devices,
    wherein the unlocking of said blocking device is performed by each of the second individual devices of the set of second individual devices.

2. The method as claimed in claim 1, wherein said padlocking comprises transmitting an access code via said set of second individual devices and comparing said access codes with access codes associated with respective second agents.

3. The method as claimed in claim 1, further comprising a step of determining a geolocation of said individual devices and wherein said locking, unlocking and padlocking are performed only in the event of proximity between the geolocation of said individual devices and geolocation of said blocking device.

4. The method as claimed in claim 1, wherein said locking, unlocking and padlocking are carried out only if there is a match between a time slot associated with said first agent, a time slot associated with said physical resource, and the current time.

5. A non-transitory computer-readable medium including executable instructions which, when executed on at least one processor, cause the at least one processor to perform the method as claimed in claim 1, on an information processing platform.

6. An individual device for access to a physical resource, the access whereof is controlled by a lockable and unlockable blocking device of a padlock type,
    circuitry for determining an identifier of said blocking device;
    circuitry for determining an access code associated with the identifier within a memory internal to said individual device as a mobile telecommunication terminal or a digital key, and
    circuitry for transmitting said access code to said blocking device;
    wherein locking and unlocking said blocking device, comprising comparing the access code transmitted by a first individual device as a mobile telecommunication terminal or a digital key and a second individual device as a mobile telecommunication terminal or computer with an access code associated with a first agent who has locked the blocking device, and padlocking said blocking device by a set of second individual devices, wherein the unlocking of said blocking device is performed by each of the second individual devices of the set of second individual devices.

7. The individual device, as claimed in claim 6, wherein said circuitry for determining the identifier of said blocking device comprises a photographic capture circuit adapted for recognition of an optical code.

8. A blocking device of a padlock type for blocking access to a lockable and unlockable physical resource configured to receive an access code from a first individual device as a mobile telecommunication terminal or a digital key and for which locking and unlocking of said blocking device comprises comparing said access code with an access code associated with a first agent who has locked the blocking device; and
    said blocking device is further configured to be padlocked by a set of second individual devices as mobile telecommunication terminals or computers, so that the unlocking can be performed only when each of the set of second individual devices has unpadlocked said blocking device.

9. A system for controlling access to a set of physical resources of an industrial site, comprising a set of blocking devices associated with said physical resource, as claimed in claim 8.

* * * * *